Sept. 2, 1958     G. M. DAVIDSON ET AL     2,850,699

CURRENT GAIN MEASURING CIRCUIT

Filed Feb. 8, 1954

INVENTOR.
GARETH M. DAVIDSON
RALPH GITTLEMAN

BY Raymond A. Paquin
ATTORNEY 2,850,699
Patented Sept. 2, 1958

United States Patent Office

2,850,699
CURRENT GAIN MEASURING CIRCUIT

Gareth M. Davidson, Bronx, and Ralph Gittleman, Great Neck, N. Y., assignors to American Bosch Arma Corporation Application February 8, 1954, Serial No. 408,908

9 Claims. (Cl. 324—158)

The present invention relates to transistor testing circuits and has particular reference to circuits for measuring the current gain.

The current gain $\alpha$ of a transistor is defined as the ratio of the short circuit collector current to the current flowing in the emitter circuit. For junction transistors the value of $\alpha$ is very nearly unity and its measurement with accuracy has presented some difficulty. The present method is particularly suitable for measurement of the current gain of junction type transistors although it can be successfully used for measuring $\alpha$ in point contact transistors as well.

One advantage of the present invention is that a null method of comparison is used so that calibrated instruments are not required.

Another advantage lies in the feature that the D. C. bias currents and voltages can be varied independently without affecting the behaviour of the A. C. measurements.

A third advantage is that under normal conditions no capacitors are required.

The present invention involves the adjustment of a variable resistor in the emitter circuit of collector short-circuited, grounded base transistor until the voltage across the variable resistor is equal to the voltage across a fixed resistor through which the base is grounded.

In this condition the ratio of the resistance values is a function of $\alpha$, and the variable resistor can be calibrated directly in terms of $\alpha$.

Figure 1:
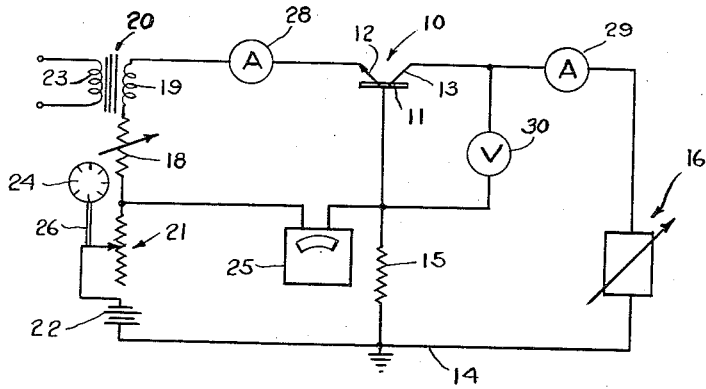
Figure 2:
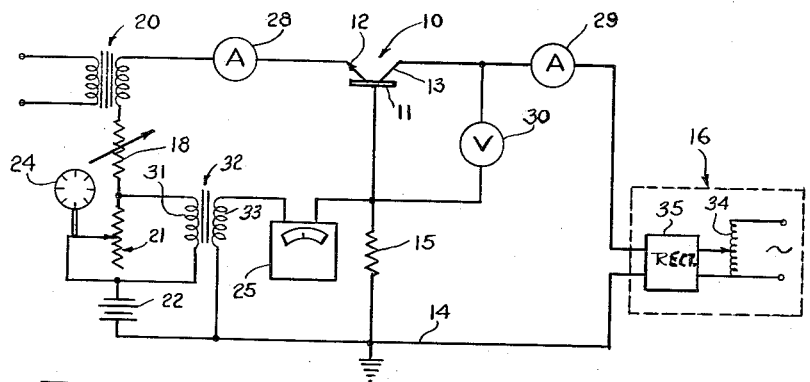
Figure 3:
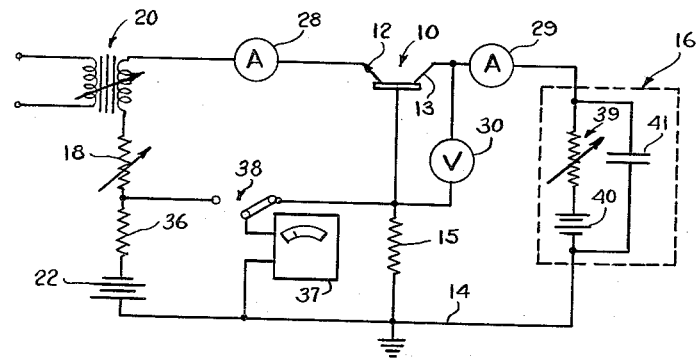

For a more complete understanding of the invention, reference may be had to the accompanying diagrams in which, Fig. 1 is a schematic diagram of one form of the invention, Fig. 2 is a modification of Fig. 1, and Fig. 3 is a further modification of Fig. 1.

Referring now to Figure 1, a transistor 10, having a base 11, emitter 12 and a collector 13, has the base 11 connected to the ground lead 14 through a fixed resistor 15. Collector 13 is connected to ground 14 through the variable bias supply 16, the polarity of which accords with the type of transistor under test. Bias supply 16 has a very low impedance to alternating current.

Emitter 12 is connected to ground 14 through the series connected resistor 18, which is preferably variable, secondary winding 19 of transformer 20, calibrated variable resistor or rheostat 21 and bias supply 22. The primary winding 23 of transformer 20 is energized by an alternating voltage to introduce an alternating signal into the emitter circuits. The polarity of bias supply 22 also depends on the transistor being tested.

An A. C. null indicator 25, which may be a voltmeter for example, is connected across the resistors 15 and 21 and a reading other than zero indicates an inequality in the alternating voltages across said resistors, assuming the impedance of the power supply 22 to be negligible. Rheostat 21 is adjusted, by rotating shaft 26 which drives the movable contact 27 of the rheostat, until the meter 25 indicates that the A. C. voltages across the resistors 15 and 21 are equal. Meter 25 may contain blocking condensers, if necessary, to block out direct current from the null indicator.

If
$i_e$ is the emitter current,
$i_b$ is the base current,
$R_1$ is the resistance of rheostat 21, and
$R_2$ is the resistance of resistor 15, Then
$$i_e R_1 = i_b R_2 \qquad (1)$$

assuming that the impedance of the bias supply 22 is negligible. However, it is known from transistor theory that
$$i_b = i_e (1-\alpha) \qquad (2)$$

(where $\alpha$ is the current gain to be measured).
Substituting (2) into (1)
$$i_e R_1 = i_e (1-\alpha) R_2 \qquad (3)$$
and therefore
$$(1-\alpha) = \frac{R_1}{R_2}$$
or
$$\alpha = 1 - \frac{R_1}{R_2} \qquad (4)$$

Thus, when meter 25 indicates a null condition, the ratio of
$$\frac{R_1}{R_2}$$
is proportional to $1-\alpha$. Conversely the value of $\alpha$ can be found from the ratio
$$\frac{R_1}{R_2}$$

Since resistor 15 is fixed, a dial 24 affixed to the shaft 26 which controls the rheostat 21 can be calibrated directly in terms of $\alpha$.

Measurements of $\alpha$ can be made for any conditions of emitter and collector bias simply by adjusting the bias currents by means of the variable supply 16 and resistor 18. The operating conditions existing at the time of measurement can be determined by connecting ammeter 28 and 29 to read the emitter and collector direct currents respectively, and the voltmeter 30 to read the collector-base D. C. voltage.

Figure 2 shows an alternative method of connecting the null indicator 25 to resistor 21. The primary winding 31 of a high impedance transformer 32 is connected across the resistor 21. The secondary winding 33 of transformer 32 is connected between one terminal of null indicator 25 and the ground 14. A small valued capacitor (not shown) may be connected in series with winding 31 to block out all direct current from the primary of transformer 32, if necessary.

With this connection the impedance of power supply 22 will not affect the accuracy of the null indication since the A. C. voltage across resistor 15 is compared only with the A. C. voltage across rheostat 21.

Figure 2 also shows one form that the variable bias supply 16 may take. The output of a variable transformer 34, which is energized from an alternating voltage supply is rectified in the rectifier 35. The output of the rectifier 35 is varied by adjusting the output of the transformer 34.

Figure 3 is a further modification of the circuit of Fig. 1 in which the variable resistor 21 is replaced by a fixed resistor 36 of known value.

A meter 37 may be connected across either resistor 21 or resistor 15 by means of switch 58. If the reading of the meter 37 when connected across resistor 15 is $M_1$ and the reading of the meter 37 when connected across resistor 36 is $M_2$, then $$M_1 = i_e R_3 \text{ and } M_2 = i_b R_2$$

where $i_e$, $i_b$, $R_2$ are as defined previously, and $R_3$ is the resistance of resistor 36.

Again, $$i_b = i_e(1-\alpha)$$

and, $$M_1 = i_e R_3;\ M_2 = i_e(1-\alpha)R_2$$

Dividing, $$\frac{M_1}{M_2} = \frac{i_e R_3}{i_e R_2(1-\alpha)} = \frac{R_3}{R_2}\frac{1}{(1-\alpha)}$$

or $$(1-\alpha)\frac{(R_2)}{R_3} = \frac{M_2}{M_1}$$

If $$\frac{R_2}{R_3} = K$$

then $$K(1-\alpha) = \frac{M_2}{M_1}$$

and if $M_1$ is a selected constant value, then $1-\alpha = K'M_2$ when $K'$ is a constant $= \dfrac{1}{KM_1}$ and the meter 37 can be calibrated to read $\alpha$ directly.

However, to get $M_1$ to the given constant value, the signal introduced by transformer 20 must be adjusted to give the desired $M_1$ reading on meter 37. Thus transformer 20 must provide a variable signal and transformer 20 may be supplied from a variable source or may be a variable coupler, for example, as shown.

A second form of collector bias supply is shown in Fig. 3 in which the variable resistance 39 and constant voltage supply 40 are connected in series, between collector 13 and ground 14. A capacitor 41 shunts the resistance 39 and supply 40 to provide a low impedance path for A. C. between collector 13 and ground 14.

We claim:

1. In a circuit for measuring the current amplification factor of a transistor, means for connecting the transistor under test in a grounded base circuit, a resistor interposed in the connections between base and ground, a direct current bias supply for the collector, said bias supply being connected to the circuit between the collector and ground, a low impedance to alternating currents between said collector and ground, said circuit having a direct current bias supply for the emitter connected thereto, an alternating signal voltage and a resistor connected between said emitter and ground, and means for comparing the alternating voltages across said resistors.

2. In a circuit for measuring the current amplification factor of a transistor, a grounded base circuit, means for connecting the transistor under test in said circuit, a resistor interposed in said circuit between base and ground, a direct current bias supply for the collector, said bias supply being connected to the circuit between the collector and ground, a low impedance to alternating currents between said collector and ground, said circuit having a direct current bias supply for the emitter connected thereto, an alternating signal voltage and a resistor connected between said emitter and ground, and means for comparing the alternating voltages across said resistors.

3. In a circuit for measuring the current amplification factor of a transistor, a grounded base circuit, means for connecting the transistor under test in said circuit, a resistor interposed in said circuit between base and ground, a direct current bias supply for the collector, said bias supply being connected to the circuit between the collector and ground, a low impedance to alternating currents between said collector and ground, said circuit having a direct current bias supply for the emitter connected thereto, an alternating signal voltage comprising the output of a transformer and a resistor connected between said emitter and ground, and means for comparing the alternating voltages across said resistors.

4. In a circuit for measuring the current amplification factor of a transistor, a grounded base circuit, means for connecting the transistor under test in said circuit, a resistor interposed in said circuit between base and ground, a direct current bias supply for the collector, said bias supply being connected to the circuit between the collector and ground, a low impedance to alternating currents between said collector and ground, said circuit having a direct current bias supply for the emitter connected thereto, an alternating signal voltage and a resistor connected between said emitter and ground, and means for comparing the alternating voltages across said resistors.

5. In a circuit for measuring the current amplification factor of a transistor, a grounded base circuit, means for connecting the transistor under test in said circuit, a resistor interposed in said circuit between base and ground, a direct current bias supply for the collector, said bias supply being connected to the circuit between the collector and ground, a low impedance to alternating currents between said collector and ground, said circuit having a direct current bias supply for the emitter connected thereto, an alternating signal voltage supplied from a variable source and a resistor connected between said emitter and ground, and means for comparing the alternating voltages across said resistors.

6. In a circuit for measuring the current amplification factor of a transistor, means for connecting the transistor under test in a grounded base circuit, a resistor interposed in the connections between base and ground, a direct current bias supply for the collector, said bias supply being connected to the circuit between the collector and ground, a low impedance to alternating currents between said collector and ground, said circuit having a direct current bias supply for the emitter connected thereto, an alternating signal voltage and a resistor connected between said emitter and ground, and means for comparing the alternating voltages across said resistors, said means comprising a voltmeter connected across said resistors.

7. In a circuit for measuring the current amplification factor of a transistor, a grounded base circuit, means for connecting the transistor under test in said circuit, a resistor interposed in said circuit between base and ground, a direct current bias supply for the collector, said bias supply being connected to the circuit between the collector and ground, a low impedance to alternating currents between said collector and ground, said circuit having a direct current bias supply for the emitter connected thereto, an alternating signal voltage and a resistor connected between said emitter and ground, and means for comparing the alternating voltages across said resistors, said means comprising a voltmeter connected across said resistors.

8. In a circuit for measuring the current amplification factor of a transistor, means for connecting the transistor under test in a grounded base circuit, a resistor interposed in the connections between base and ground, a direct current bias supply for the collector, said bias supply being connected to the circuit between the collector and ground, a low impedance to alternating currents between said collector and ground, said circuit having a direct current bias supply for the emitter connected thereto, an alternating signal voltage and a resistor connected between said emitter and ground, and means for comparing the alternating voltages across said resistors, said means comprising a voltmeter connected across said resistors, said voltmeter containing blocking condensers.

9. In a circuit for measuring the current amplification factor of a transistor, a grounded base circuit, means for connecting the transistor under test in said circuit, a resistor interposed in said circuit between base and ground, a direct current bias supply for the collector, said bias supply being connected to the circuit between the collector and ground, a low impedance to alternating currents between said collector and ground, said circuit having a direct current bias supply for the emitter connected thereto, an alternating signal voltage and a resistor connected between said emitter and ground, and means for comparing the alternating voltages across said resistors, said means comprising a voltmeter connected across said resistors, said voltmeter containing blocking condensers.

References Cited in the file of this patent

"Production Tester for Transistors," Hunter et al., Electronics, October 1950, pages 96–99.

"Test Techniques for Transistors," Turner, Radio-Electronics, March 1952, pages 78, 80, 82, 84.

"Transistor Characteristics at Low and Medium Frequencies," Giacoletto, Tele-Tech & Electronic Industries, March 1953, pages 97–99, 150, 151, 157.